United States Patent [19]

Kawamura

[11] Patent Number: 5,024,057
[45] Date of Patent: Jun. 18, 1991

[54] EXHAUST-DRIVEN ELECTRIC GENERATOR SYSTEM FOR INTERNAL COMBUSTION ENGINES

[75] Inventor: Hideo Kawamura, Samukawa, Japan

[73] Assignee: Isuzu Motors Limited, Tokyo, Japan

[21] Appl. No.: 370,877

[22] Filed: Jun. 23, 1989

[30] Foreign Application Priority Data

Jun. 29, 1988 [JP] Japan ................................ 63-161773

[51] Int. Cl.$^5$ ............................................. F01D 15/10
[52] U.S. Cl. ...................................... 60/597; 290/52; 60/614
[58] Field of Search ................... 60/597, 598, 602, 607, 60/608, 614; 290/52

[56] References Cited

U.S. PATENT DOCUMENTS 4,339,922  7/1982  Navarro ............................ 60/605.1

FOREIGN PATENT DOCUMENTS

| 9843 | 4/1980 | European Pat. Off. . |
| 141634 | 5/1985 | European Pat. Off. . |
| 214615 | 12/1983 | Japan ................................... 60/597 |
| 4814 | 1/1986 | Japan ................................... 60/597 |
| 93430 | 4/1987 | Japan ................................... 60/597 |
| 298620 | 12/1987 | Japan ................................ 60/605.1 |
| 215808 | 9/1988 | Japan ................................... 60/597 |

*Primary Examiner*—Michael Koczo
*Attorney, Agent, or Firm*—Staas & Halsey

[57] ABSTRACT

An electric generator system drivable by the energy of exhaust gases emitted from an internal combustion engine includes two turbines drivable by the energy of exhaust gases from the internal combustion engine, the turbines having different capacities, and an electric generator mounted on a turbine shaft interconnecting the turbine impellers of the turbines. When the energy of exhaust gases emitted from the engine is larger, the turbine of the larger capacity is driven. When the exhaust energy is smaller, the turbine of the smaller capacity is driven.

8 Claims, 1 Drawing Sheet

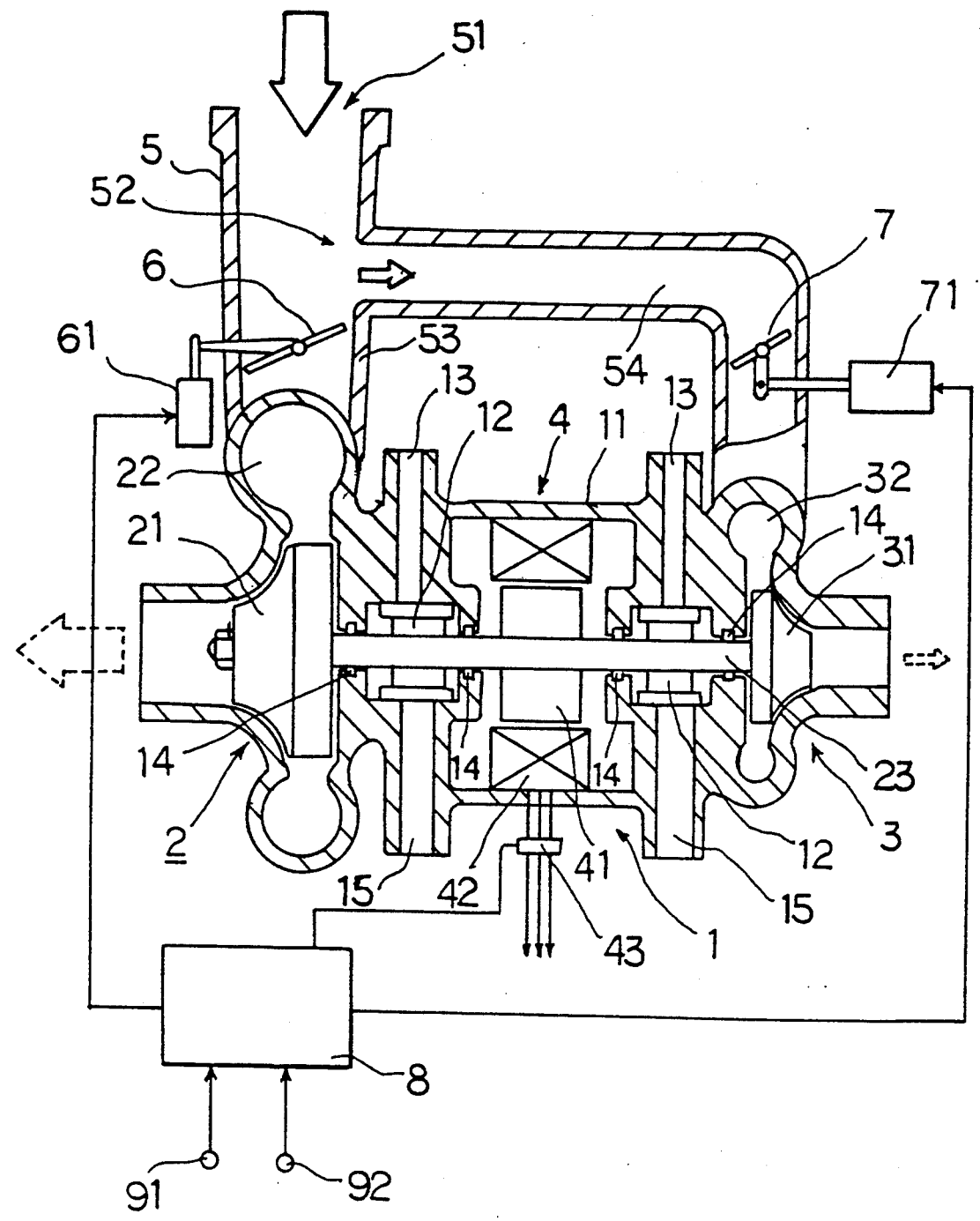

EXHAUST-DRIVEN ELECTRIC GENERATOR SYSTEM FOR INTERNAL COMBUSTION ENGINES

BACKGROUND OF THE INVENTION

The present invention relates to an electric generator system which is operated by the energy of exhaust gases emitted from an internal combustion engine.

Various systems have heretofore been proposed for recovering the energy of exhaust gases discharged from an internal combustion engine, in the form of electric energy into which the exhaust energy is converted. One such system is disclosed in Japanese Laid-Open Patent Publication No. 63-95124, for example.

The above publication discloses an exhaust-driven electric generator which is mounted on the shaft of a turbine drivable by the energy of exhaust gases and which is operable by the exhaust energy to generate electric power. Since the generator is mounted on the turbine shaft without the intermediary of any power transmitting device to drive the generator, the generator can be driven with good efficiency. However, because only one turbine is driven by the exhaust energy, the efficiency of the turbine varies depending on changes in the temperature and amount of the exhaust gases discharged by the internal combustion engine, and hence the efficiency with which the exhaust gas is recovered is not of a satisfactorily high level. More specifically, an internal combustion engine mounted on an automobile has a wide range of operational parameters, i.e., the temperature and amount of exhaust gases emitted from the engine vary in a wide range. If a turbine that matches a high temperature and a large amount of exhaust gases discharged when the engine operates under a high load and at a high speed is selected for use with the engine, then the efficiency of the turbine is greatly lowered when the temperature and amount of exhaust gases are low at the time the engine operates under a low load and at a low speed. On the contrary, if a turbine matching a low temperature and a small amount of exhaust gases emitted when the engine operates under a small load and at a low speed is selected for use with the engine, then the efficiency with which the exhaust gas is recovered is also lowered when the temperature and amount of exhaust gases ar increased in high-load and high-speed operation of the engine, since the exhaust gases have to be partly discharged in bypassing relation to the turbine in order to avoid destruction of the turbine.

SUMMARY OF THE INVENTION

It is an object of the present invention to provide an exhaust-driven electric generator system for use with an internal combustion engine, the generator system having turbines which can be driven with good efficiency to convert the energy of exhaust gases emitted from the engine efficiently into electric energy, even if the temperature and amount of exhaust gases from the engine vary.

According to the present invention, there is provided an electric generator system drivable by the energy of exhaust gases emitted from an internal combustion engine, comprising two turbines drivable by the energy of exhaust gases from the internal combustion engine, the turbines having respective turbine scrolls, a turbine shaft interconnecting the two turbines, an electric generator mounted on the turbine shaft, first and second exhaust gas inlet pipes having ends connected respectively to the turbine scrolls and having other ends adapted to be connected to an exhaust pipe of the internal combustion engine, switching means for controlling communication between the first and second exhaust gas inlet pipes and the exhaust pipe of the internal combustion engine, detecting means for detecting an operating condition of the turbines, and control means for controlling the switching mean based on a detected signal from the detecting means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

The sole figure is a block diagram of an exhaust-driven electric generator system for use with an internal combustion engine in accordance with the present invention.

DESCRIPTION OF THE PREFERRED EMBODIMENT

As shown in the figure, an exhaust-driven electric generator system 1 according to the present invention is driven by the energy of exhaust gases emitted from an internal combustion engine (not shown) and converts the exhaust gas energy into electric energy. The electric generator system 1 has a larger turbine 2, a smaller turbine 3, and a generator 4 drivable by these turbines 2, 3. The larger turbine 2 has a turbine scroll 22 defining therein a flow passage of a larger cross-sectional area and a larger-diameter turbine impeller 21 rotatably disposed in the turbine scroll 22. The smaller turbine 3 has a turbine scroll 32 defining therein a flow passage of a smaller cross-sectional area and a smaller-diameter turbine impeller 31 rotatably disposed i the turbine scroll 32. The turbine impellers 21, 31 are coupled to each other by means of a turbine shaft 23 which is rotatably supported in a housing 11 by means of a pair of axially spaced bearings 12. The generator 4 comprises a rotor 41 mounted on the turbine shaft 23 and constructed of permanent magnets having large residual magnetism, and a stator 42 disposed in the housing 11 in confronting relation to the rotor 41 for generating electromotive forces due to changing magnetic fluxes produced by the rotor 41 as it rotates. The housing 11 has oil inlet passages 13 defined therein for supplying lubricating oil to the bearings 12. Oil seals 14 are disposed on each side of each of the bearings 12 and positioned between the housing 11 and the turbine shaft 23. The housing 11 also has oil outlet passages 15 defined therein for discharging lubricating oil from the bearings 12.

A first exhaust gas inlet pipe 53 defines therein a flow passage having a larger cross-sectional area and has one end connected to the turbine scroll 22 of the larger turbine 2. The other end of the first discharge gas inlet pipe 53 is connected to an exhaust pipe 5 of the non-illustrated engine. A second exhaust gas inlet pipe 54 defines therein a flow passage having a smaller cross-sectional area and has one end joined to the turbine scroll 32 of the smaller turbine 3. The other end of the second exhaust gas inlet pipe 54 is coupled to the exhaust pipe 5. Shutters 6, 7 are disposed respectively in the first and second exhaust gas inlet pipes 53, 54 and openable and closable by actuators 61, 71 comprising electric motors or the like. The shutters 6, 7 serve as switching means for selectively connecting the turbine scrolls 22, 32 to the exhaust pipe 5. Control commands are applied to the actuators 61, 71 from a controller 8 (described in detail later).

A frequency sensor 43 serves as a means for detecting the rotational speed of the turbine shaft 23. The frequency sensor 43 measures the frequency of electric power supplied from the stator 42 to detect the rotational speed of the turbine shaft 23. The frequency sensor 43 applies a detected signal to the controller 8.

The rotational speed of the internal combustion engine is detected by a rotational speed sensor 91, and the load on the internal combustion engine is detected by a load sensor 92. Detected signals from these sensors 91, 92 are delivered to the controller 8.

The controller 8 comprises a microcomputer having a central processing unit for effecting various arithmetic operations, various memories for storing the results of arithmetic operations, a control program, etc., an inlet/outlet port, and other components. In response to signals from the frequency sensor 43, the rotational speed sensor 91, and the load sensor 92, the controller 8 effects certain arithmetic operations according to the control program, and produces and applies control commands to the actuators 61, 71.

The exhaust-driven electric generator system thus constructed operates as follows:

When the internal combustion engine operates to produce output power greater than a certain output level, the temperature of exhaust gases emitted from the engine is high and the amount thereof is also large. Therefore, the energy of the emitted exhaust gases is large, and the turbines driven by the exhaust gas energy rotates at a high speed. Hence, the turbine shaft 23 rotates at a high speed. In response to a detected signal from the frequency sensor 43, the controller 8 keeps open the shutter 6 disposed in the first exhaust gas inlet pipe 53, and applies a closing command to the actuator 71 to close the shutter 7 in the second exhaust gas inlet pipe 54 thereby bringing the second exhaust gas inlet pipe 54 out of communication with the exhaust pipe 5. Therefore, the exhaust gases emitted by the engine flow from the exhaust pipe 5 through the first exhaust pipe inlet pipe 53 into the turbine scroll 22 of the larger turbine 2 in which the exhaust gases drive the larger-diameter turbine impeller 21 efficiently. As the turbine impeller 21 rotates at a high speed, the rotor 41 of the generator 4 mounted on the turbine shaft 23 also rotates at a high speed, enabling the stator 42 to generate AC electric power efficiently and supplies it through its terminals. The generated AC electric power is applied to an electric load (not shown). The frequency sensor 43 detects the rotational speed of the turbine 23 based on the frequency of the AC electric power produced by the generator 4, and applies the detected signal to the controller 8. When the rotational speed of the turbine 23 as detected by the frequency sensor 43 is higher than a predetermined speed, the controller 8 keeps the shutter 6 open.

If the output power of the internal combustion engine is reduced to reduce the amount of emitted exhaust gases, the larger turbine 2 is driven less efficiently and its speed is lowered, whereupon the detected signal from the frequency sensor 43 drops below a predetermined signal level. When the detected signal from the frequency sensor 43 drops below the predetermined signal level, the controller 8 applies a closing command to the actuator 61 and an opening command to the actuator 71. Therefore, the shutter 6 is closed and the shutter 7 is opened. As a result, the exhaust gases are no longer supplied to the larger turbine 2, but introduced from the exhaust pipe 5 through the second exhaust pipe inlet pipe 54 into the turbine scroll 32 of the smaller turbine 3 in which the exhaust gases drive the smaller-diameter turbine impeller 31. Therefore, even when the amount of exhaust gases is reduced, since the smaller turbine 3 which operates efficiently with a smaller amount of exhaust gases is driven, the turbine shaft 23 rotates at a high speed. Although the amount of generated electric power is lower, the generated voltage and its frequency are increased, and hence the exhaust energy from the internal combustion engine can be recovered highly efficiently.

If the operating conditions of the engine vary and increase the exhaust energy to a level which rotates the turbine shaft 23 at a speed higher than a predetermined speed while the smaller turbine 3 is being driven to generate electric power, the controller 8 responds to the signal from the frequency sensor 43, and applies a closing command to the actuator 71 to close the shutter 7 and an opening command to the actuator 61 to open the shutter 6. Therefore, the exhaust gases emitted from the internal combustion engine are supplied from the exhaust pipe 5 through the first exhaust inlet pipe 53 into the turbine scroll 22 of the larger turbine 2, thereby driving the larger turbine impeller 21 highly efficiently.

In the above embodiment, the shutters 6, 7 are selectively opened and closed on the basis of the detected signal from the frequency sensor 43 serving as the means for detecting the rotational speed of the turbine shaft 23. However, the shutters 6, 7 may be controlled based on a signal which indicates the conditions in which the turbines operate. For example, inasmuch as the exhaust gas energy from the internal combustion engine depends on the rotational speed of and the load on the engine, the shutters 6, 7 may be controlled on the basis of the signals from the rotational speed sensor 91 and the load sensor 92. While the two turbines 2, 3 having different sizes are employed in the illustrated embodiment, there may be employed two turbines of relatively small capacity, and exhaust gases may be supplied to both turbines when the exhaust energy is larger and exhaust gases may be supplied to only one of the turbines when the exhaust energy is smaller.

Although a certain preferred embodiment has been shown and described, it should be understood that many changes and modifications may be made therein without departing from the scope of the appended claims.

What is claimed is:

1. An electric generator system drivable by the energy of exhaust gases emitted from an internal combustion engine, comprising:
    two turbines drivable by the energy of exhaust gases from the internal combustion engine, said turbines having respective turbine scrolls;
    a turbine shaft interconnecting said two turbines;
    an electric generator mounted on said turbine shaft;
    first and second exhaust gas inlet pipes having ends connected respectively to said turbine scrolls and having other ends adapted to be connected to an exhaust pipe of the internal combustion engines;
    switching means for controlling communication between said first and second exhaust gas inlet pipes and the exhaust pipe of the internal combustion engine;

detecting means for detecting the rotational speed of said turbine shaft; and control means for controlling said switching means based on a detected signal from said detecting means.

2. An electric generator system according to claim 1, wherein said turbines comprise a larger turbine and a smaller turbine, respectively.

3. An electric generator system according to claim 1, wherein said switching means comprises shutters disposed respectively in said first and second exhaust gas inlet pipes, and selectively openable and closable by said control means.

4. An electric generator system according to claim 1, wherein said generator comprises an AC generator.

5. An electric generator system according to claim 4, wherein said detecting means comprises means for detecting the frequency of electric power generated by said AC generator.

6. An electric generator system drivable by the energy of exhaust gases emitted from an internal combustion engine, comprising:

two turbines drivable by the energy of exhaust gases from the internal combustion engine, said turbines having respective turbine scrolls;

a turbine shaft interconnecting said two turbines;

an electric generator mounted on said turbine shaft;

first and second exhaust gas inlet pipes having ends connected respectively to said turbine scrolls and having other ends adapted to be connected to an exhaust pipe of the internal combustion engine;

switching means for controlling communication between said first and second exhaust gas inlet pipes and the exhaust pipe of the internal combustion engine;

detecting means for detecting an operating condition of said turbines; and control means for controlling said switching means based on a detected signal from said detecting means;

wherein said generator comprises an AC generator, and wherein said detecting means comprises means for detecting the frequency of electric power generated by said AC generator.

7. An electric generator system according to claim 6, wherein said turbines comprise a larger turbine and a smaller turbine, respectively.

8. An electric generator system according to claim 6, wherein said switching means comprises shutters disposed respectively in said first and second exhaust gas inlet pipes, and selectively openable and closable by said control means.

* * * * *